250-203. R AU 256 EX
4-16-74 XR 3,804,976

United States Patent [19]

Gard

[11] 3,804,976

[45] Apr. 16, 1974

[54] MULTIPLEXED INFRARED IMAGING SYSTEM

[75] Inventor: Jerold H. Gard, Los Altos, Calif.

[73] Assignee: Kaiser Aerospace and Electronics Corporation, Oakland, Calif.

[22] Filed: May 15, 1972

[21] Appl. No.: 252,972

[52] U.S. Cl. .................... 178/6.8, 178/7.6, 250/203, 250/236, 250/334

[51] Int. Cl. .................... H04n 7/18

[58] Field of Search .............. 178/6, 6.8, 7.6, 7.85, 178/7.88, 7.89, DIG. 20, DIG. 23; 250/203, 236, 83.3 HP; 350/332, 334

[56] References Cited

UNITED STATES PATENTS

| | | | |
|---|---|---|---|
| 3,251,933 | 5/1966 | Beste | 178/6.5 |
| 3,443,110 | 5/1969 | Kelsall | 250/236 |
| 3,219,642 | 11/1965 | Killpatrick | 250/203 R |
| 3,670,097 | 6/1972 | Jones | 178/6.5 |
| 2,967,211 | 1/1961 | Blackstone et al. | 178/7.6 |
| 3,109,057 | 10/1963 | Slavecki et al. | 178/6.5 |

FOREIGN PATENTS OR APPLICATIONS

| | | | |
|---|---|---|---|
| 700,982 | 12/1953 | Great Britain | 178/6.5 |

*Primary Examiner*—Robert L. Griffin
*Assistant Examiner*—Joseph A. Orsino, Jr.
*Attorney, Agent, or Firm*—Johnson, Dienner, Emrich, Verbeck & Wagner

[57] ABSTRACT

An infrared imaging system in which the image output of each of a plurality of optic systems is scanned by a rotating reflective system and fed in successive vertical segments to a vertical detector array which provides an electrical output related to the radiation pattern of each scanned image segment which is detected thereby. A synchronizing circuit enabled by the reflective system controls electronic readout of the signals provided by the detector array to discrete storage means for each optic system. A separate readout circuit is operative to enable readout of the stored images at a rate which is different than the write-in rate to monitor units, each of which is preassigned to display the image provided by a different one of the optic systems.

16 Claims, 10 Drawing Figures

MULTIPLEXED INFRARED IMAGING SYSTEM

BACKGROUND OF THE INVENTION

An infrared image forming system as currently used in the field basically comprises a sensor system which scans a given area or source in a sequential manner for a radiometric pattern, and associated processing circuitry which is responsive to such scan to provide a visual picture of such pattern on associated video display equipment. In most systems of such type, optical units are utilized to view a desired field, and the long wavelength radiation (commonly called "heat") which is output from such field provides a radiometric pattern which is focused by the optic system into an array of detectors which are sensitive to the long wavelength infrared radiation. The detectors, in turn, provide a useful electrical output which represents the voltage, current or apparent resistance change which is proportional to the infrared radiation pattern of the scanned area. The changing signal output of the detectors is processed and the resultant signals are applied to a display device, such as a cathode ray tube, which generates a raster scan in a pattern analogous to the pattern of scan by the detector array of the image of the scanned area provided by the optic system.

In one form of detector used in image forming systems, a plurality of detectors are arranged in a vertical array, the width of the array being such as to detect or view a small segment of the image provided by the optic field. A scanning device, which may be a mirror, is mounted for reciprocal motion relative to the optic system to thereby effect focussing of successive vertical segments of the image or scene provided by the optic system on the vertical array of detectors. During the same period that the mirror is being mechanically displaced to focus correspondingly different vertical segments of the scene on the detector array, electronic switching means effects readout of the information from the detectors at a relatively fast rate. The electronic readout is accomplished so rapidly that in effect no motion of the image scene presented to the detector array occurs during one vertical readout of the detector array. Consequently, a number of readouts, as for example 400 to 500, may be made of the vertical detector array during one horizontal scan of the scene by the mirror element.

Such mode of scan of a scene is similar to the scan effected by a television vidicon camera except that in the present instance the horizontal scan is relatively slow, whereas in the television vidicon scan the horizontal scan is at a fast rate and the vertical scan is at a slower rate. The signal output of the vertical detector array is fed to the electron beam gun of the cathode ray tube, and associated deflection circuitry controls the beam to sweep vertically in synchronism with the switching of the output of successive ones of the detectors to the electron beam gun. The horizontal scan is in turn synchronized with the lateral movement of the reciprocating mirror. In this manner, a visual picture of the infrared radiation in the scene is produced on the screen of the cathode ray tube.

Such system has several fundamental limitations which are related to the nature of the detectors and the characteristics of the human eye. For repetitive raster presentation of the type described the critical fusion frequency will, with most subjects, lie between 40 and 60 cycles per second with variations between the peripheral and foveal vision in this respect being well known. In that it is highly desirable to show a bright, flicker-free picture of the image, a 60 cycle raster repetition rate is usually selected. As a result, the vertical scan rate selected is near the upper bandwidth of the detectors. If the system is operated at a more rapid rate, the resolution with which the scene is reproduced will be seriously degraded. Thus, as will be shown, while there is good reason to operate at a faster rate, the operation at such increased rate with known equipment is not practical. There is a need for a system in which improved image presentations are provided in such type system.

In addition to the foregoing needs, it has been found that there is a need in many existing and projected applications for imaging systems in which two pictures can be obtained simultaneously from a single sensing array. The smaller observation helicopter is a good example of such need since, for the pilot's purposes, a fixed wide field view of the terrain and obstacles ahead is desired for best flying using the infrared system. On the other hand, the observer in the helicopter, who is required to detect, identify and accurately locate the targets, preferably uses a narrow movable field of detection with high magnification of the image. Neither of the helicopter crew can therefore obtain the optimum information input of using the other's picture.

The obvious answer consists of providing two separate systems. However, the size and weight of two systems to give the two simultaneous pictures tends to be prohibitive for the smaller sized helicopters. The weight problem is particularly significant since for best sensitivity the detector array must be cooled to cryogenic temperatures, and the weight and space required in a helicopter for two separate cooling systems creates a serious loading problem.

SUMMARY OF THE INVENTION

It is an object of the present invention to provide a novel, multiplexed infrared imaging system which is operative to provide a display of an image obtained with a first optic system on a first display device, and to simultaneously provide an image obtained with a second optic system on a second display device in which a common, single set of detector means, and a single cryogenic cooling system are used to provide the two discrete sets of image displays.

It is a further object of the invention to provide an infrared imaging system of such type which has a display presentation of improved quality and brightness.

It is a further object of the invention to provide a system having means for holding a given image in storage to permit analysis thereof over an extended period (i.e., frame freeze).

In the infrared imaging system of the present invention, first and second optic systems are used to provide discrete image outputs for monitoring purposes. An associated reflective system comprising a rotating reflective member having reflective surfaces on one or both sides thereof is rotated to scan successive vertical segments of the image output from each optic system in a given sequence. A detector array comprising a plurality of vertically stacked units is operative as successive segments of the scanned images are moved into the field of view of the detector array to provide signal outputs which are related to the radiometric pattern of each such vertical segment.

The output signals thus provided by the detector array are gated into an associated storage means by a synchronizing circuit which includes sensor means which detect frame marks and timing marks located on the rotating reflective system. Readout means for the detector array are enabled by the sync means as each timing mark is sensed, and storage selection means are selectively enabled by the synchronizing circuit in response to each frame mark to gate the signals read from the detector array to the storage means which is preassigned to store the output of a given one of the optic systems. As will be shown, the information provided by the optic system is thus scanned at a horizontal rate which is determined by the speed of rotation of the reflective system, and at a vertical rate which is determined by the speed of readout of the detector array.

Each storage means includes readout means which are controlled by a separate sync circuit at the conventional television horizontal and vertical rates to simultaneously control readout from each of the storage means, and the display of such information on separate monitors in a conventional raster trace. Such system thereby achieves readout of information for display at a raster rate which is consistent with good picture viewing quality, while yet permitting write-in of the information into storage at an optimum rate which is consistent with the bandwidth of the detector array.

In addition, such system has minimum weight and space requirements by reason of the fact that only a single detector array and a single cryogenic system are required to provide the signal display of the images provided by a plurality of separate optic systems.

Other features of the invention will be apparent with reference now to the drawings.

GENERAL DESCRIPTION

Figure 1:
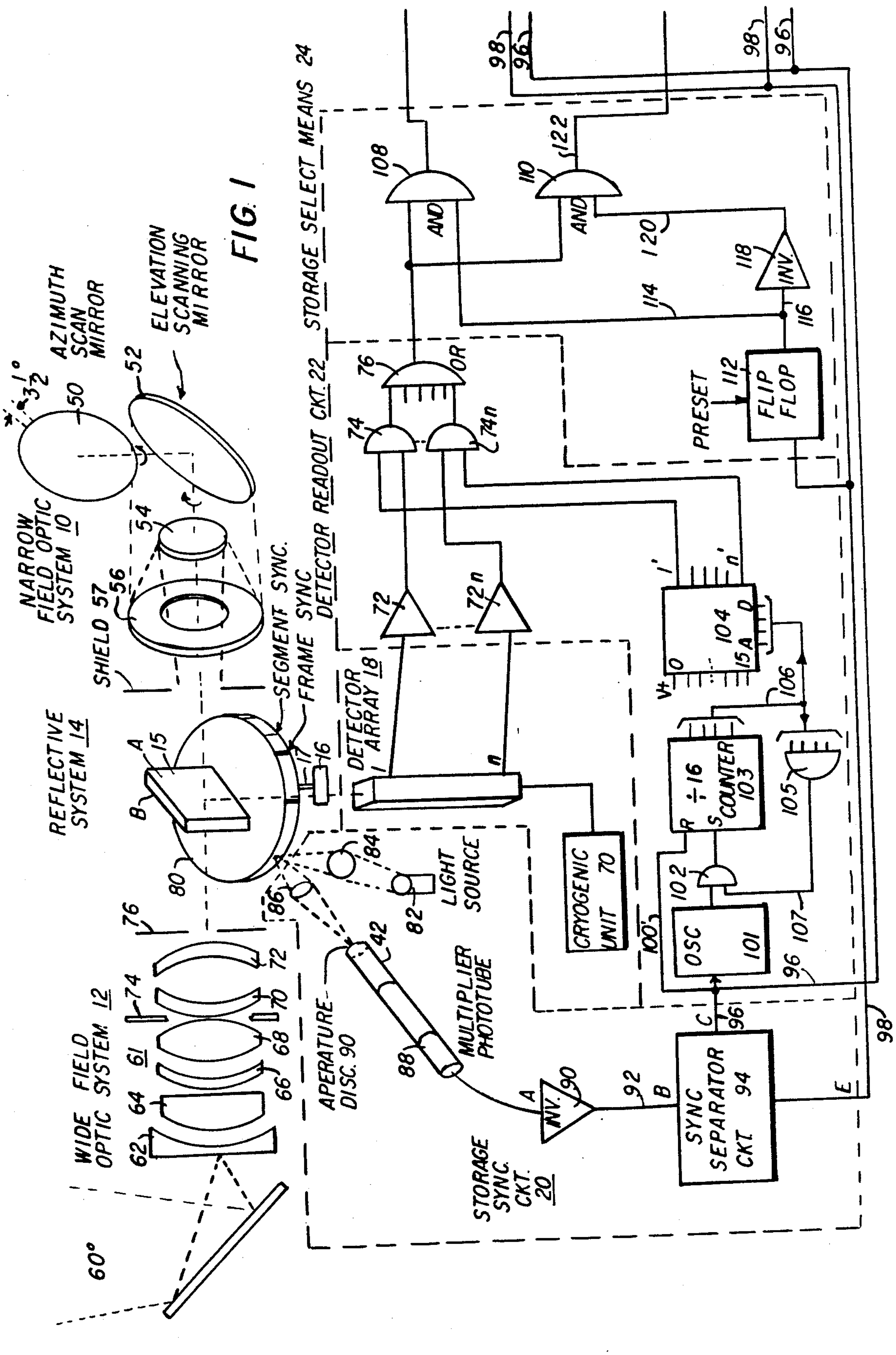
FIGS. 1 and 2 set forth the infrared imaging system and circuit.

With reference to FIG. 1, one embodiment of the novel imaging system of the invention is disclosed thereat. As there shown, the system comprises a first optic system 10 which has a relatively narrow field of view (in one embodiment in the order of 3½ degrees) and a second optic system 12 which has a relatively wider field of view (in one embodiment in the order of 60 degrees).

A reflective system 14 mounted on shaft means 17 for rotation by associated drive means 16 includes a two-sided reflective member, such as a mirror 15, disposed on the optical axes of the first and second optic systems to deflect the image output of such optic system into the field of view of a vertical array of detectors. More specifically, as one reflective surface, such as surface A of the reflecting member 15, is moved into a predetermined relative position with the image output of optic system 10 as shown in FIG. 1, a segment of the image provided by optic system 10 is reflected in the direction of the vertical detector array 18. Since the vertical array of detectors has a relatively narrow viewing area, only a small vertical segment of the image will be picked up by the detector array 18, the width of the segment being qual to the width of the detectors used (in the order of 0.3% of the total image in one embodiment). However, as the reflective system 14 rotates in the clockwise direction, successive vertical segments of the image output by optic system 10 are directed toward the detector array 18, and in such manner the entire image is viewed by array 18.

As will be shown the detector array 18 is operative to generate electric signals which represent the radiation pattern which is viewed in each vertical segment, and as a result, with rotation of the reflective surface A of member 15 to sequentially direct each of the vertical segments of the image output from optic system 10 into the viewing field of the detector array 18, a readout of the signal produced for the successive vertical segments will represent the entire image provided by optic system 10.

With continued rotation of the reflective system 14, the reflective surface A is brought into registration with the image output from the optic system 12, and such image is successively presented in like manner to the field of view of detector array 18. With further rotation of the reflective system 14, the second reflective side B of member 15 is moved into scanning position for the image output of optic system 10 and thereupon directs successive vertical segments of the image output of optic system 10 to the viewing field of detector array 18. With continued rotation, the reflective side B is brought into scanning position for the image output of optic system 12 and in such combined movement directs sync vertical signals of the image output by optic system 12 to the detector array 18. Thus in each 360° of rotation of reflective system 14, the image output of each optic system 10, 12 is fed twice to the detector array 18.

The detector array 18 as shown in FIG. 1 is cooled in known manner by a cryogenic system 70 to cryogenic temperatures which may be in the order of 77°K (−196°C).

The electrical signal output of the detector array for each vertical segment of the images as thus scanned is read out and fed to associated storage means 26, 28 (FIG. 2) for storage and reconstruction as a complete image. For such purpose, a storage sync circuit 20 which is enabled by signals derived in the timing unit reflective system 14 provides synchronizing signals to a detector readout circuit 22 to effect selective gating of the signals from each of the units in the vertical array 18, the readout of the units in one embodiment being electronically effected in sequence at 4 MHz.

Figures 2, 3:
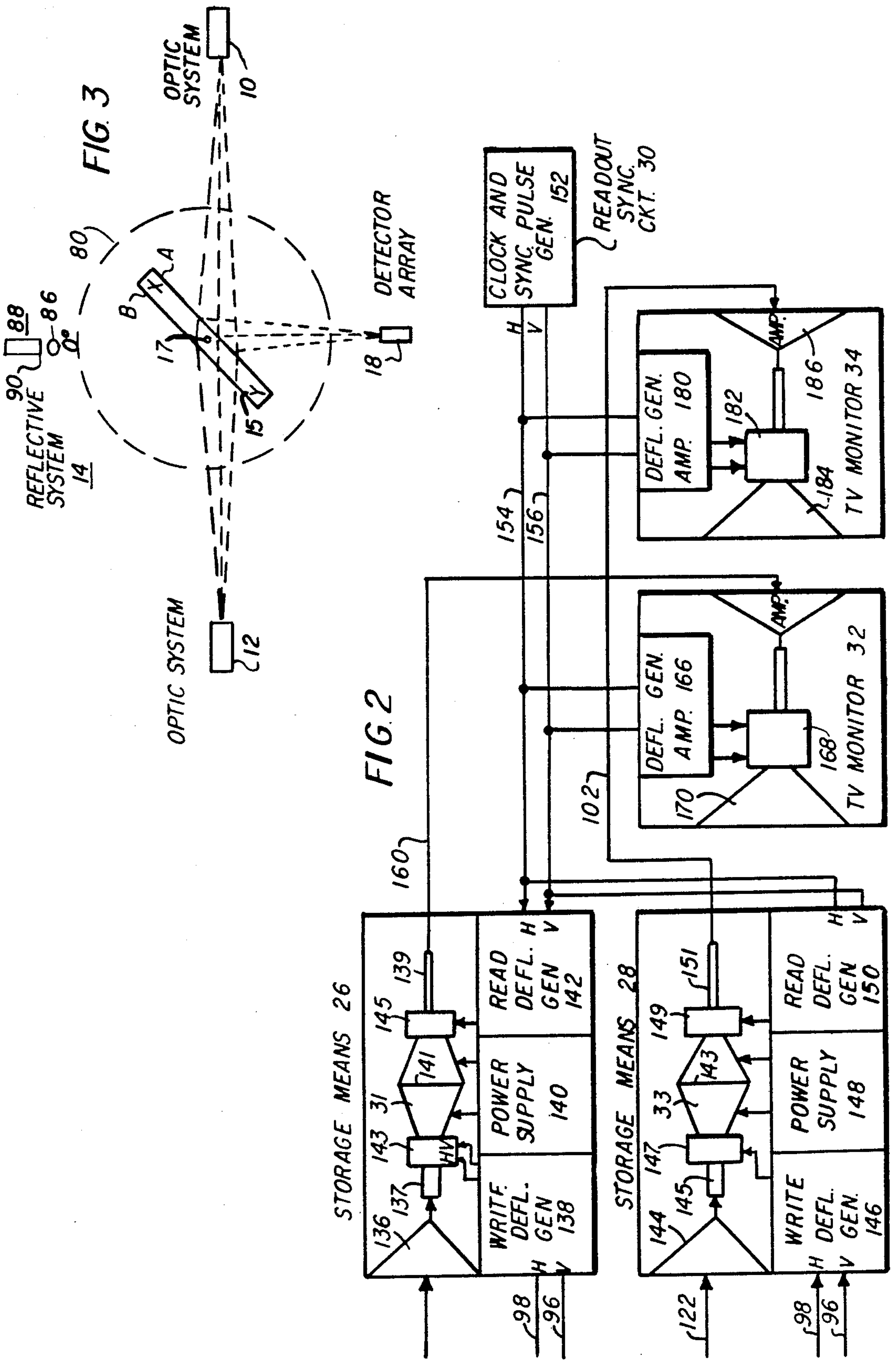
FIG. 3 sets forth a plan view of the relative locations of the optic systems detector array and reflective device of the system.

Storage select means 24, connected to the output of the detector readout circuit 22, is also controlled by signals from the storage sync circuit 20 to selectively gate the signals output from the detector array 18 to storage means 26 or 28 (FIG. 2). That is, the signals output by detector array 18 during scanning of the image provided by the narrow field optic system 10 is selectively gated by storage select means 24 to the first storage means 26 (FIG. 2), and the signal output from the detector array 18 during scanning of the image provided by the wide field optic system 12 is selectively gated to the second storage means 28.

As will be shown in more detail, storage means 26 and 28 in one embodiment comprise double-ended scan converter tubes 31, 33 respectively, whereby the images stored on the respective tubes 31, 33 may be read out at a rate different than the rate at which the information is input thereto from the detector array 18.

For such purpose, a discrete read sync circuit 30 is operative to provide signals for effecting the readout of the information on the storage means 26, 28, respectively, at the conventional horizontal rate of 15,750 Hz and vertical rate of 60 Hz for display on associated conventional TV monitors 32, 34 respectively. It will be apparent therefrom that a single reflective system 14 and detector array 18 are operative to provide discrete video displays on monitors 32, 34 of the two sets of information detected by the discrete optic systems 10 or 12, respectively.

It will also be apparent that by inhibiting the update of either storage means 26 or 28 frame freeze can be provided since readout of the image from a double-ended scan converter tube is, for a given period, non-destructive.

SPECIFIC DESCRIPTION

With reference once more to FIG. 1, the narrow field optic system 10, in one embodiment, comprises a narrow field Cassegrainian system having a relatively narrow field of view (approximately 3½° in one embodiment), and basically includes an azimuth mirror 50 and an elevation mirror 52, a lens system 54, 56 and a shield 57. For flexibility in use, the azimuth scan mirror 50 and elevation scanning mirror 52 may be mounted in adjustable mounting means which permit selection of a desired object or scene by the optic system at different relative horizontal and vertical bearings. The azimuth scan mirror and elevation scanning mirror may in accordance with known techniques by mounted for operation to the different positions manually or by associated servo systems.

While various types of optic systems may be selected in accordance with the desired application of the system, in one preferred embodiment the lens system 54, 56 basically comprises an aspherical primary mirror 56 and a spherical secondary mirror 54, mounted so that the image detected in the 3½° field of view by scanning mirrors 50, 52 is directed to primary reflector 56 for reflection to secondary reflector member 54 and direction through shield 57 toward the reflective member 15 in reflective system 14. Both primary and secondary reflectors 54, 56 may be fabricated from aluminum, properly overcoated, and aluminized.

In an alternate embodiment, suitable turret mounting means may be provided to support the illustrated secondary mirror 54 and a further mirror which is similar to secular mirror 54, but which is approximately twice the radius and has a focal length of 12.2 inches. With such arrangement, rotation of the turret to selectively introduce alternate ones of the secondary lines into the system permits selection of either a 3½° or a 7° field to thereby provide a more flexible field scan arrangement.

The wide field optic system 12 (which again may be selected from a number of known optic systems which provide the desired image input) in the embodiment shown in FIG. 1 comprises a fixed set of wide field refractive optics including fixed folding mirror 60 which folds the image detected in a 60° field over a lens set 61 including elements 62, 64, 66, 68, 70 and 72 consisting of silicon and germanium elements. Element 68 is double-convex, elements 62 and 64 are plano-concave and plano-convex, respectively, and element 66 is a concave-convex (meniscus) lens. Elements 70 and 72 are weak cylindrical correctors required to give a slight cylindrical curvature to the image plane so that it remains in good focus throughout the useful scan of reflective member 15. An aperture stop 74 located between elements 66 and 68, and a shield 76 limits the size of the image projected by the lens set 61 in direction of the reflective system 14. In one embodiment the focal length of the lens system 61 is 1.299 inches and its $f$ rating is 1.5. Optic systems of other designs which are suitable for the intended system application can, of course, be used without departing from the scope of the invention.

The reflective system 14 basically comprises a 900 rpm motor gear drive 16 having a drive shaft 17 for rotatably driving timing disc member 80 and a two-sided reflective member 15, each side A, B of the reflective mirror 15 being disposed to successively intercept the optical axes of the narrow field optic system 10 and wide field optic system 12 in the rotation of member 15 and to reflect the output of such system in the direction of a detector array 18.

With reference to FIG. 3, representative locations of the optic systems 10 and 12, the reflective system 14, and the detector array 18 are shown in plan view. As there illustrated the reflective member 15 is rotated through a 360° path and the focal axes of the lens of the narrow field optic system 10 and the wide field optic system 12 are located along such path at 180° relative to each other, and with the axes thereof slightly offset from the vertical axis of the rotating mirror 15. The slight offset of the axes of optical systems 10 and 12 with respect to the vertical axis of rotating mirror 15 is required because the said mirror has a finite thickness. Thus, the axes to be properly reflected to detector array 18, are preferably parallel to but offset from the 0° – 180° line by an amount equal to $t/2\ \sqrt{2}$. For simplicity the ends of this axis will be referred to as the 0° and 180° points. The detector array 18 is displaced 90° relative to the focal axes of the optic systems 10 and 12, and has its vertical axis disposed in alignment with the vertical axis of the mirror 15.

With the zero degree position of member 15 assumed to be as indicated by the 0° mark in FIG. 3, the optic systems 10 and 12 are shown to be located at the 90° and 270° positions respectively, and the detector array is located at the 180° position. It will be apparent that as the one end X of member 15 moves from the 0° position to the 45° position, the focal center of the image output by optical system 10 will be directed by reflective surface A into the field of view of the detector array 18. In that one-half degree of mirror movement is equivalent to 1° of image travel, the 3½° image which is provided by the optic system 10 will be scanned by the reflective surface in 1.75° rotation of mirror 15. Accordingly the first vertical segment of the image is reflected into detector array 18 as the mirror end X advances to (45° – 1.75/2) or 44.125°, the center vertical signal is reflected nto detector array 18 as the mirror end X advances to 45° and the last vertical segment of the image will be reflected into the sight area of detector array 18 as the mirror end X advances to 45.875° (i.e., a rotation if mirror 15 through 1.75°).

As motor drive means 16 further rotates shaft 17 and mirror 15, mirror surface A moves out of registration with the image provided by the optic system 10, and is advanced into position to reflect the first vertical segment of the image output of optic system 12 in the direction of the array 18.

It will be apparent that the middle vertical segment of the image provided by the optic system 12 will be reflected to the vertical array 18 when the reflective surface A is at an angle of 45° to the focal axes of optic system 12. Such condition occurs as the end Y of reflective member 15 advances to 315° and end X is at 135°. Assuming optic field 12 has a field of 60°, the first vertical segment of the image output from optic system 12 will be reflected by surface A of mirror 15 to the detector array 18 as the mirror end Y advances to (315°—1/2 × 60/2) = 300°. The successive vertical segments of the image output from optic field 12 are reflected to the detector array 18 as the surface A of mirror 15 is moved through successive positions to the 330° position.

As the drive 16 continues to rotate reflective member 15, and end Y is advanced through the 0° position to 44.125°, the reflective side B will project the first vertical segment of the image output of optic system 10 into the viewing area of detector array 18. With continued rotational advance of the reflective member 14 through 45.875°, the successive vertical segments of the image output from optic system 10 are reflected into the viewing area of vertical array 18.

As continued rotation moves end X on reflective member to 300°, reflective surface B of mirror 15 transmits the first vertical segment of the image output from optic system 12 to vertical array 18, and in its continued movement through 330°, the reflective surface B effects selective reflection of the successive vertical segments of the image output from optic system 12 into the viewing area of detector array 18.

It will be seen from the foregoing description that as the reflective member 15 advances through 360° there is provided, in order, a first scan of the image output from optic system 10, a first scan of the image output from optic system 12, a second scan of the image output from optic system 10 and a second scan from the image output from optic system 12, each scan comprising the reflection of successive vertical segments of the image output from such optic systems to the field of view of detector array 18.

In one modification of the invention, a modified Geneva motion is utilized to vary the rate of angular rotation of the shaft 17 (and therefore reflective member 15) as a function of its position. That is, if the two-sided reflective member 15 is rotated at a constant angular velocity, the image provided by optic system 10 is scanned a total of only 3.75° in each 360° of scan (2 × 1.75°). It is apparent that in such arrangement, a rather extended period of rotation occurs during which no useful information is transmitted to the detector array 18. This extended period, in which no useful information is provided to the detector, results in an increased bandwidth requirement for the detectors and associated circuits. With the provision of a modified Geneva-motion with drive system 16, however, the reflective system 14 is driven at a speed during scan of the narrow field of optic system 10 which is approximately 1/20 of the speed used in scanning of the field of optic system 12, whereby an equal amount of scanning time is provided in each revolution for each image. In addition, a faster speed is used in traversing the angle between the image scanning positions, whereby the inactive time between scanning of the image provided by the optic systems 10 and 12 respectively is minimized.

By way of specific example, in an embodiment such as shown in FIG. 1, which has a first optic system 10 having a 3½° field and a second optic system 12 having a 60° field, the 3½° field might be swept at a rotational speed of 8.33 revolutions per minute (or 50° per second for 0.035 seconds--the field is scanned at an angular rate at twice that of the mirror so only 1.75°of movement is required for the scan of such field). The sixty° field of optic system 12 would in turn be scanned at 857° per second corresponding to a rotational speed of 143 revolutions per minute.

It will be apparent that other modifications using different mirror structure mountings and different drive devices may be used without departing from the spirit of the invention. By way of example, multiple facet or multiple mirrors may be used to provide additional information to the detector array 18 and thereby reduce the inactive time of the reflective system 15 without resorting to the use of a Geneva-type movement. Other similar variations of the system will be apparent to those skilled in the art.

DETECTOR ARRAY

As shown in FIG. 1, the detector array 18 comprises a plurality of individual elements, one type of which is commercially available from Santa Barbara Research Center, a division of Hughes Aircraft. Such elements are known in the field as quantum detectors which respond to the detection of discrete energy quanta (photons) which produce electrical changes in the atomic structure of the detector material. At room temperature, thermal activity in the atomic structure will tend to mask the effect of the low energy photons, and accordingly a cryogenic cooler, such as illustrated unit 70, is normally utilized to provide the necessary cold temperature environment for the detector. Temperatures as cold as 4°K to 77°K are not uncommon for such detector units, and as a result, the cryogenic equipment used in the coding process is normally quite heavy and bulky.

The vertical array in one embodiment comprised 1—*n* units stacked and mounted in vertical alignment to provide a field of view relative to the reflected images which is in the order of 0.01° per detector for the narrow field and 0.172° per detector for the wide field. The axis of the field of view of the detector array is located, as noted above, at approximately 90° to the focal axes of the optic system 10 and 12, and in vertical alignment with the vertical axis of the reflector member 15.

In operation, the infrared detector units of array 18 convert the electromagnetic radiation which is reflected by the reflective mirror 15 into registration with the detector elements into a measurable physical response (in one embodiment an output voltage). The signal output of the detector array 18 which is generated as each vertical segment of an image is reflected into the field of response of the vertically aligned units 1—*n* of detector array 18 is read out from the detector by a detector readout circuit 22 and storage sync circuit 20. As shown in FIG. 1, detector readout circuit 22 which effects signal readout from the array 18 comprises discrete preamplifiers 72–72n and discrete readout gates 74–74n, the signal output of each element in the array being continually connected through its associated preamplifier as one input to an associated one of the gates 74–74n. The second input to each of the gates 74–74n comprise gating signals provided by multiplexer gate pulse generator 104 which are applied to the gate in sequence at a 10 KHz rate in a manner to be set forth. It will be apparent that the horizontal rate of scan of the image is, in effect, determined by the rate of rotation of the reflective system 14 to move the successive vertical segments of each image into view of the detector array 18, and the vertical rate of scan is determined by the rate of scan of gates 74–74n in detector readout circuit 22.

Synchronization of the readout of the gates 74–74n with the rotational movement of disc 80 (i.e., the vertical and horizontal scan rates) is basically determined by a series of timing marks which are located, in the embodiment of FIG. 1, on the peripheral rim or edge of disc 80. As will be shown, a series of narrow vertical lines or timing marks are located at spaced intervals along the peripheral edge of disc 80, each of which timing marks initiates a readout of the detector array 18 by the gates 74–74n. The spacing of the timing marks on the disc 80 is therefore related to the field of view of the detector array 18, a successive timing mark being moved into the enabling position as soon as the disc 80 has rotated through an angle related to the width of the field of view of the detector array 18.

In addition to the narrow synchronizing lines which appear at predetermined intervals along the peripheral edge of the disc, the disc 80 further locates four major or frame synchronizing marks (similar to the timing marks but of a greater width) each of which identifies the instant at which th leading vertical segment of an image output by one of the optic systems is moved in position for detection by the vertical detector array 18. Each frame mark, in effect, thus responds to the vertical sync signal in a television raster generating circuit.

The location of the frame marks on the periphery of disc 80 must bear a specific relationship to the position of the rotating scanning mirror 15 and the location of sensor lens 86 and aperture disc 90 in storage sync circuit 20. Thus, in the disclosed embodiment the image formed on the aperture disc 90 by lens 86 of a frame mark on disc 80 is of a size to cover the aperture of disc 90 at the time the mirror 15 begins to reflect the leading edge (i.e., the first vertical segment) of the image provided by optical system 10 or 12 to the detector array 18. With reference to FIG. 3, in an embodiment wherein phototube 88 includes a lens 86 and an aperture disc 90 positioned at 0°, and the 0° position of the mirror 15 is denoted as the position in which the X end of mirror 15 is located at the illustrated 0° position and in which the angles increase with rotation of mirror 15 in a clockwise direction, the timing mark denoting the beginning of the frame from optics system 10 will be located at 315.875° on disc 80. The second such mark, denoting the beginning of a useful scan of the image from optics system 12, would be located at 245°, the third at 135.875° and the fourth at 60° on disc 80.

As shown in FIG. 1, the frame marks and the timing or segment marks are detected by a photodetector system which includes a light source 82 and associated lens 84 which concentrates the light rays output from light source 82 onto the peripheral edge of disc 80 for reflection back through lens 86 and aperture disc 90 of a multiplier phototube 88.

Multiplier phototube 88 is located adjacent to the peripheral edge of disc 80 and shielded from ambient light in such manner that the detector of the multiplier phototube 88 is struck only by light which is reflected from the peripheral surface of the disc 80 and focussed by lens 86 on the extremely small aperture of disc 90.

It will be apparent that as the disc 80 is rotated, the frame and timing marks on the edge of the disc 80 will be moved past the aperture disc 90, and the light rays reflected into the multiplier phototube 88 will be repeatedly interrupted by such marks. Multiplier phototube 88 is responsive in known manner to generate a voltage waveform representative of the interruptions of the light source 82 by such marks. A representative waveform output is shown in FIG. 4A, the wider pulses there shown being generated whenever a frame mark is detected by the phototube 88 at the start of each image scan and the narrower pulses being generated as the segment marks are detected by the phototube 88.

Figures 4A, 4B, 4C, 4D, 4E, 4F, 4G:
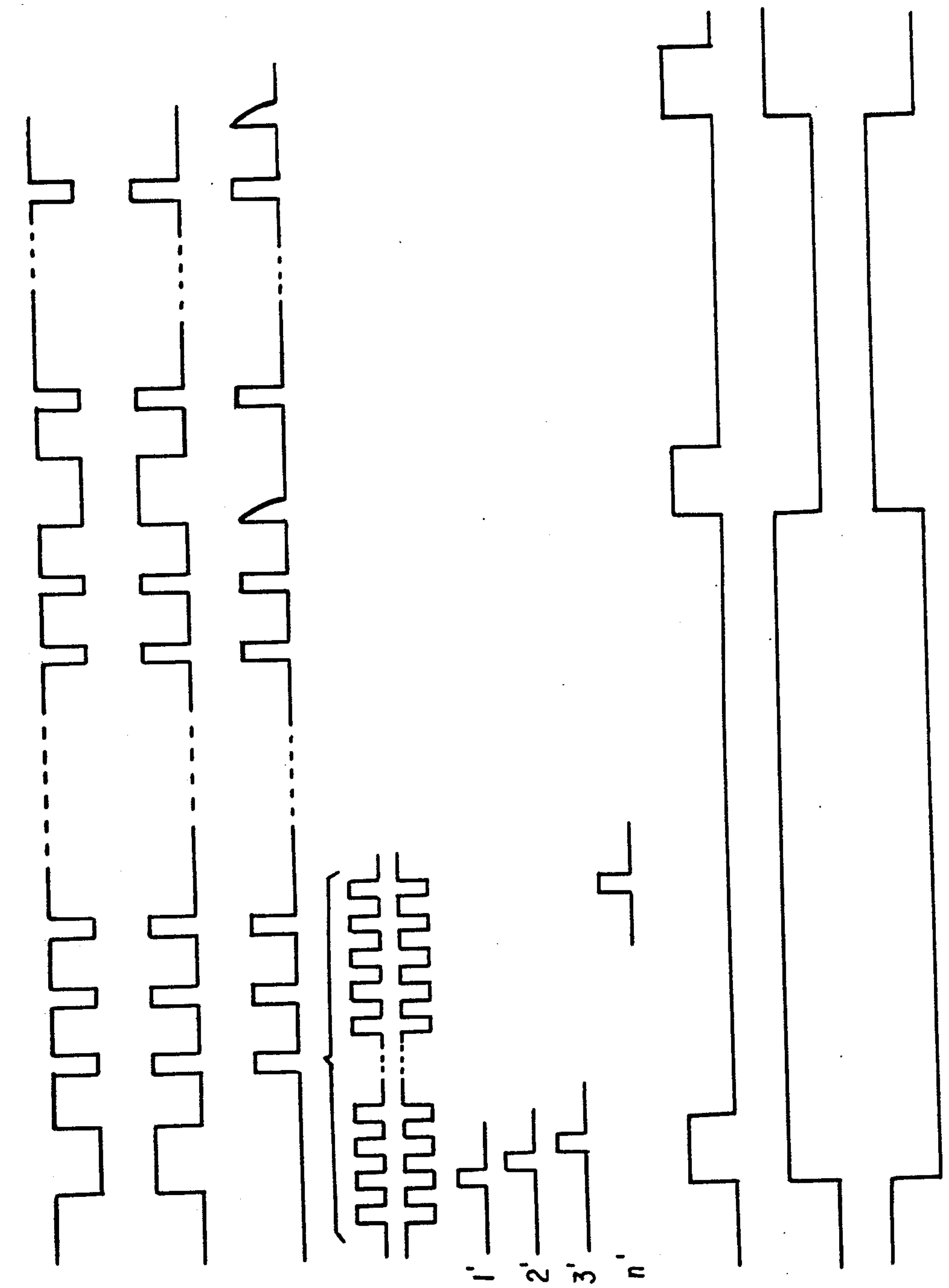
FIGS. 4A-4G set forth waveforms which are output at different locations in the circuit set forth in FIGS. 1 and 2.

The waveform output from phototube 88, as shown in FIG. 4A, is fed over inverter 90 (FIG. 1) to provide a waveform shown in FIG. 4B over path 92 to the input of the sync separator circuit 94, which circuit may be of the type utilized in commercial television circuitry to separate the vertical and horizontal sync pulses output from a conventional television sync circuit.

While there has been described above one embodiment in which the frame and segment marks are located on the peripheral edge of the disc 80, it will be readily apparent that other sync means and modes may be employed. Alternative systems could, for example, utilize mechanical, magnetic or optical indicators and sensors in a like manner. In a magnetic arrangement, for example, a magnetic head may be used as a sensor to detect the frame and timing pulses recorded on a magnetic tape which is wound about the circumference of the disc. While the illustrated embodiment includes markings located on the peripheral edges of the disc 80, it is apparent that the markings could alternatively be located on either surface of the disc 80. Other modifications of the sync signal generating arrangement utilized herein will be readily apparent.

Sync separator circuit 94, as noted above, operates in a known manner to separate the wide and narrow pulses in the waveforms (FIG. 4) which are input thereto over inverter 90, the circuit 94 being operative responsive to the timing pulses to provide sync pulses over path 96 and being responsive to the frame pulses to provide sync pulses over path 98. The timing pulse output over path 96 is fed to a high-speed, free-running synchronized oscillator 101 which produces a series of pulses at 4 mHz for the duration of each segment impulse input thereto over path 100 to one input of gate 102. The leading edge of the same pulse over conductor 100' effects reset of a ÷ 16 counter 103. The binary output A–D of counter 103 is fed to the steering circuit A–D of a demultiplexer circuit 104 (which may be of the type commercially available from Texas Instruments as an SN 54154). The inputs 0–15 of demultiplexer 104 are connected to V+ and the outputs 1' – n' (where $n = 15$) are connected as a second input to each of the gates 74–74n. The A–D output of counter 103 is also connected over path 106 as inputs to a NAND gate 105 whereby a logic 1 (count 15) on each of the inputs to gate 105 will result in a logic 0 to one input of gate 102 and thereby block the output of free-running oscillator 101 from counter 103.

With the detection of a segment mark by sync separator circuit 94, the pulse over conductors 96, 100' to reset input R for counter 103 effects reset of counter 103 and the resultant output of binary signal 0000 over conductors A–D to gate 105. As a result, gate 105 places a logic 1 on the second input to gate 102 and the 4 KHz pulse output of free-running oscillator 101 drives the counter through fifteen steps and effects the count output 0–15 in binary code over conductor A–D. With the successive count inputs to steering circuit A–D of demultiplexer 104, the V+ (logic 1) on inputs 0–15 are fed successively to outputs 1' – n' ($n = 15$) and gates 74–74n are successively energized to conduct the signal output of the successive elements of array 18 over OR gate 76 to storage select means 24. As the count advances to fifteen (1111) gate 105 once more blocks gate 102 and the counter 103 is stopped until a succeeding signal pulse is input on conductor 100'.

As noted above, each of the outputs 1' – n' are connected to an input of a correspondingly different one of the gates 74, 74n, and as conductors 1' – n' are successively energized with logic 1 pulses from multiplex gate pulse generator 104, each of the gates 74-74n which are connected to conductor 1' . . . n' will be energized in sequence at the 4 mHz rate.

As each of the gates 74–74n is thus sequenced, the signal output of the successive elements 1 . . . n of the vertical detector array 18 are gated to OR gate 76. Thus as the first output conductor 1' of pulse generator 104 is enabled by a logic 1 signal, AND gate 74 will be enabled to output to OR gate 76 the signal which is output from element 1 of detector array 18. As the successive gates of the set 74 . . . 74n are enabled, the signal output of each of the successive elements in the vertical array 18 are gated to OR gate 76, whereby the readout of a set of signals provided by the vertical array 18 for a vertical segment of the image being scanned is effected. It is noted that the gate drive pulses on conductors 1' . . . n' abut in time; that is, the leading edge of the pulse on output n is coincident with the trailing edge of the pulse on output n–1 so that in effect a least one of the AND gates 74 . . . 74n is open at all times.

The resultant waveform which appears at the output of gate 76 during one readout sequence of detector array 18 is a video waveform which represents the vertical segment of the image which was reflected to the detector array 18 by the reflective system 14.

The preceding description of the number of gates 74 was assumed to be $n = 15$. It can readily be seen that if higher resolution is desired, provision can be made for switching of a large number of detectors by a simple engineering extension of the disclosed circuits.

The video waveform output of OR gate 76 is selectively applied to the first storage means 26 or the second storage means 28 in accordance with the particular image which is being scanned. That is, during the period that the image output by the narrow field optic system 10 is being scanned by reflective system 14, gate 108 in the storage selector means 24 will be enabled to direct the video waveform output over OR gate 76 into storage means 26, and during the period that the image output by wide field of optic system 12 is being scanned by reflective system 14, gate 110 in storage selector means 24 is enabled to direct the video waveform output over gate 76 to the second storage means 28 for storage thereon. Selection of the storage means to be utilized for the storage of such image representing signal is controlled by the four frame marks which are located on the peripheral edge of disc 80 to identify the start of each scan of an image.

More specifically, as a frame pulse is detected by multiplier phototube 88 and fed over inverter to sync separator circuit 94, the sync separator circuit operates in known manner to output a frame sync pulse over path 98 to flip-flop 112.

Flip-flop 112 is preset so that at the time that the first frame mark on disc 80 is detected (i.e., the mark which represents the start of scan of the image provided by the narrow field optic system 10) by the multiplier phototube 88, the sync pulse (FIG. 4E) on path 98 will set flip-flop 112 and logic 1 pulse (FIG. 4F) is output over path 114 as a second input to gate 108. The same logic 1 pulse over inverter 118 provides a logic 0 pulse to one input of AND gate 110. AND gate 108 is accordingly enabled (and AND gate 110 is disabled) during the period of scan of the image output from optic system 10, whereby the video waveform output from OR gate 76 is fed over gate 108 to the first storage means 26.

As disc 80 continues in its rotation the scan of the image output from optic system 10 is completed, and a blank period occurs until the second frame mark is brought into the sensing region of phototube 88. Sync separator circuit 94 thereupon provides a second pulse over conductor 98 to flip-flop 112 which operates in known manner to provide a logic 0 output (FIG. 4E) over conductor 114 to disable AND gate 108. The same logic 0 pulse is output over path 116 and inverter 118 to provide a logic 1 (FIG. 4C) over path 120 to the second input of AND gate 110 whereby the video waveform output from OR gate 76 during the period that the image provided by wide field optic system 12 is scanned will be fed over path 122 to the input for second storage means 28.

Storage means 26 and 28 in the present embodiment basically comprise double ended scan converter tubes 31, 33 which have the capability of accepting the signal output of the detector array 18 at the slower scanning rates of the sync circuit 20 and the rotating disc 80. As will be shown, the information which is thus obtained from the system at the slower rate is by means of the double ended scan converter tubes 31, 33, converted to video signals which can be displayed at standard television scan rates on conventional TV monitors 32, 34 in a flicker-free presentation.

Briefly, the storage means 26, 28 may be of the type which are commercially available from Hughes Aircraft Company, Industrial Products Division, Oceanside, California, as Model No. LcSc-1 which contain a tube of the so-called double-ended type, which tube includes two electron guns 137, 139 located on opposite sides of a storage matrix 141, and associated deflection members 143, 145 for controlling the position of the electron beams output from guns 137, 139 respectively.

Storage means 26, 28 are similar in structure. As shown in FIG. 2 storage means 26 include an amplifier 136 which amplifies the video waveform input thereto from the detector readout circuit 22 via storage select means 24 during the period that the reflective system 14 is scanning the image output by optic system 10. The video signal output of the amplifier 136 is fed to the electron beam gun 137 of the write section of the double-ended scan tube 31.

Horizontal and vertical deflection members 143 which control the position of the beam output of gun 137 for the write portion of the double-ended tube 31 are in turn enabled by write deflection generator circuit 138, the beam being controlled to trace a pattern similar to that achieved by the reflective system in its scan of the image output by optic system 10 and in synchronism therewith. More specifically, the frame sync output pulse which is output from sync separator 94 over conductor 98 is connected to the horizontal deflection circuitry of generator circuit 138, and the timing pulses input on conductor 96 by sync separator 94 are fed to the vertical deflection circuitry of the generator circuit 138 for double-ended converter tube 130. Conventional power supply means 140 provides the high voltage power for the double-ended tube 130.

As noted above, the video signal waveform which is output by detector array 18 during the scan of a vertical segment of the image provided by optic system 10 is fed to electron beam gun 137. During the same period that the video waveform for a vertical segment of the image is input to gun 137, the vertical deflection circuit is controlled by a pulse from the write deflection generator 138 to move in a vertical line along one side of the storage matrix 141 of tube 31 at a vertical sweep repetition rate of 10 KHz.

As a second vertical segment of information is provided by detector array 18 in the same image scan, the write deflection generator 38 adjusts the beam horizontally and as a further sync pulse is output on conductor 96 by sync separator circuit 94, write deflector generator 138 moves the write beam in a vertical line which closely parallels the first vertical line trace along which the information representing the first sampled vertical segment of the image was stored. In this manner, the video waveform input from detector array 18 is stored on the target 141 in a raster pattern.

Storage means 26 further include read deflection generator circuit 142 which controls the electron beam of gun 139 in the readout of the stored information from the storage matrix 141 at a different rate than the write rate and at a rate which is consistent with the rates used in standard television monitors. A separate readout sync circuit 30 is operative to provide the horizontal sync and vertical sync signals over conductors 154, 156 to the read deflection circuit 142 at the standard television rates of 60 Hz and 15,750 Hz respectively to effect readout of the information on storage matrix 141 in a standard TV raster pattern, and the input of such information over path 160 to the TV monitor 32 in the same raster pattern and rate.

Storage means 28 is identical in structure and operation to storage means 26 and as shown in FIG. 27 comprises an amplifier 144 for amplifying the video waveform output from the detector readout circuit 22 whenever the optic system 12 is being scanned by the reflective system 14. Such information as amplified by amplifier 144 is fed to the electron beam gun 145 in the write section of the double-ended scanner tube 132. Write deflection circuit 146 is controlled, in the manner of deflection circuitry 138, by the synchronizing pulses on paths 96, 98 respectively to effect writing of the video waveform information provided by detector array 18 to the gun 145 on the storage matrix 143 of the double-ended tube 33. Such writing is effected during the 0.035 seconds of active horizontal scan at a vertical frequency of 10 KHz. Power supply 148 supplies the high voltage power for tube 33. Readout of the information stored on target 143 is controlled by read deflection generator circuitry 150, which in response to the horizontal and vertical sync segment on conductors 154, 156, moves the beam of gun 151 in a conventional raster pattern to readout the information stored on the double-ended tube 33 over conductor 102 to monitor 34 at the standard television rates.

Each of the monitors, such as 32, 34 includes conventional amplifier and deflection generator circuitry 166, 180 which are responsive to the horizontal and vertical sync signals on conductors 154, 156 to provide a raster trace on the screen of tubes 170, 184. Since the information stored in the storage means 26, 28 is read out by a raster trace on storage matrix 141, 143 and the raster on the monitor tubes 170, 184 is traced in synchronization therewith the information which is stored on the storage matrices 141, 143 and fed over conductors 160, 102 to monitors 32, 34 will be displayed in a related position on the monitor tube 170, 184 respectively. The information detected in the scan of an image provided by optic system 10 and stored in storage means 26 is thus displayed on the screen of tube 170, and the information detected in the scan of an image detected by optic system 12 and stored on storage means 28 will be displayed on the screen of tube 184.

It is seen from the foregoing description that a discrete presentation of separate sets of images is effected using the detector scanning rates of known infrared systems without increasing the detector bandwidth limitations. Moreover, the two discrete images provided by the optic systems on two separate monitors is effected with a single set of detectors and a single cryogenic unit which is associated therewith.

While the storage means 26, 28 have been illustrated as comprising double-ended scan converter tubes, it is apparent that other types of storage devices may be utilized therewith. Thus, by including suitable digital means for digitizing the information output from the storage selector means 24, 26, other conventional types of digital storage means, such as rotating drums or discs or solid state micro-circuit devices may be used to store the information obtained during the image scan.

In certain infrared systems, one type of which is manufactured and sold by Texas Instruments, multiplexing of the detectors (and the electrical noise resultant therefrom) is eliminated by employing light emitting diodes, one each of which is associated with each of the detectors, thus forming a set of light emitters analogous to the detectors. The image formed on these diodes is a picture of the original infrared radiation, and this picture is focussed on and scanned across the face of a storage vidicon, which stores this picture for readout by the vidicon beam. In adpating the present invention to this method of scan conversion, two different methods may be used. In the first, two light emitting diodes are employed with each detector, one each in two sets being configured and moved in a manner analogous to the scanning of the detector array by rotating reflector 15. Such sets are driven by alternate frames through gates which are analogous in function to gates 108, 110 and are viewed by two long persistence cameras, one for each set of light-emitting diodes. The storage functions of the double-ended scanner tubes 130 and 132, as used herein, are thus accomplished by the vidicon camera, and the double-ended storage tubes 130, 132 may therefore be eliminated. The function of the clock and sync pulse generator 152 and TV monitors 32 and 34 would remain the same.

In an alternate version of this mechanism, one set of light-emitting diodes can be used and the spatial images obtained therefrom representing alternately the images obtained from optical systems 10 and 12, may be directed alternately and appropriately to two long persistence vidicon cameras, the alternating of images accomplished by a rotating optical element similar in function to and operating in synchronism with optical element 14.

Although these alternate methods eliminate the need for the multiplexing of individual detector elements of detector array 18 and the need for double-ended storage tubes 31, 33 by using the multiplexing storage capability inheret in the combination of a light emitting diode array and storage vidicon cameras, they do not change the principles or depart from the spirit of the invention.

The novel arrangement may also be used in systems other than infrared imaging systems, as for example, LLLTV or daytime TV, ultraviolet and wavelengths other than infrared without departing from the scope of the invention.

I claim:

1. In an infrared imaging system, a plurality of optic systems, each of which provides a different image output, common detector means for said plurality of optic systems comprising a plurality of detector elements for detecting infrared signals output from each of said optic systems, image scan means including a mechanically driven means operable in each cycle to direct successive segments of an image output from one of said optic systems to said common detector means, and further operable in the same cycle to direct the successive segments of the image output from each of the others of said optic systems to the input of the same common detector means, said mechanically driven means comprising a rotatable member having at least two reflective surfaces for scanning the image outputs of said optic systems, each of which reflective surfaces scans the image output from each of said plurality of optic systems a plurality of times during each rotation and applies said image output to the same detector means, a plurality of storage means, each of which is preassigned to store the image information provided by a correspondingly different one of said optic systems, and means responsive to said image scan means for selectively connecting the signal output of said common detector means to the one of said storage means which is preassigned to store the information for the image being scanned.

2. In a system as set forth in claim 1 in which said plurality of optic systems include a first and second optic system located at 180° intervals along the path of rotation of said rotatable member, and said common detector means comprises a linear array of elements which are displaced 90° relative to each of the optic systems.

3. A system as set forth in claim 1 in which said plurality of optic systems includes a first optic system having a field of a first width and a second optic system having a field of a different width, whereby one system simultaneously provides an output having two different fields of view.

4. A system as set forth in claim 1 in which said plurality of optic systems includes at least a first optic system and a second optic system, said second optic system having one or more scanning devices affixed thereto so that its field of view may be positioned as desired with respect to that of the first.

5. A system as set forth in claim 1 in which certain of said optic systems include scanning devices for directing the fields of view of such system with respect to the fields of the other optic systems and with respect to the position of the detector set.

6. A system as set forth in claim 2 which includes means for driving said rotatable member at a first speed which determines the frequency of readout of each vertical segment of said images by said detector means, and in which said means for selectively connecting the signal output of said detector means to one of said storage means operates at a second frequency which determines the frequency of readout of the individual bits of each vertical segment.

7. In an infrared imaging system, a plurality of optic systems, each of which provides a different image output, common detector means for said plurality of optic systems comprising a plurality of detector elements for detecting infrared signals output from each of said optic systems, image scan means including a mechanically driven means operable in each cycle to direct successive segments of an image output from one of said optic systems to said common detector means, and further operable in the same cycle to direct the successive segments of the image output from each of the others of said optic systems to the input of the same common detector means, said mechanically driven means including position means which move mechanically with said mechanically driven means and which include indicia markings thereon, a plurality of storage means, each of which is preassigned to store the image information provided by a correspondingly different one of said optic systems, sync means for providing sync signals in response to said indicia on said position means, and means responsive to said sync means for selectively connecting the signal output of said common detector means to the one of said storage means which is preassigned to store the information for the image being scanned.

8. A system as set forth in claim 7 in which said indicia includes a frame mark on said position means for indicating the first vertical segment of each image detected, and segment marks on said position means for indicating the successive vertical segments of the image.

9. A system as set forth in claim 7 in which said means for connecting the output of said detector means to said storage means includes gating means cyclically operative in response to each sync signal to sequentially read out the signals provided by each detector element for the portion of the image which is directed thereto by said image scan means.

10. In an infrared imaging system a plurality of optic systems, common detector means comprising a plurality of detector elements for detecting infrared signals output from each of said optic systems, image scan means comprising mechanically driven means operable in each cycle to direct successive segments of an image output from one of said optic systems to said detector means, and further operable in the same cycle to direct the successive segments of an image output from the others of said optic systems to said common detector means, sync means including indicia on said mechanically driven means for generating sync signals, a plurality of storage means, each of which is preassigned to store the image information provided by a correspondingly different one of said optic systems, means enabled by said sync means to selectively connect the signal output of said common detector means to the one of said storage means which is preassigned to store the information for the one of the images being scanned, a plurality of display means, each of which is preassigned to display the signals stored by a different one of said storage means, and circuit means for effecting readout of the stored signals in each storage means to the preassigned one of the display means.

11. A system as set forth in claim 10 in which each of said display means comprises a cathode ray tube and associated raster generator circuitry for each cathode ray tube, and in which each of said storage means includes discrete readout means for providing the stored signals to its associated display means, and in which said circuit means comprises timer means for providing further sync signals to said raster generator circuitry for each cathode ray tube and simultaneously to the readout means for its associated storage means.

12. A system as set forth in claim 10 in which said means for selectively connecting the signal output of said detector means to said storage means is enabled by said sync means at a frequency related to the operating frequency of said image scan means, and in which said circuit means for effecting readout of the stored signal to the display means is effected at a video monitoring frequency.

13. In an imaging system, at least a first and a second optic system, common detector means comprising a plurality of elements which detect infrared radiation in images provided at times by said first optic system and at other times by said second optic system, image scan means including an image scanning member having at least a first and a second reflective surface, means for rotating said image scanning member in a pattern to cause the first reflective surface to direct successive segments of the image output from one of said optic systems to said detector means, and to further direct the successive segments of image output from the second one of said optic systems to the same detector means, and in continued rotation to cause the second reflective surface to successively direct successive segments of the image output of said first and second optic system to the same detector means, the number of such elements in said detector means being determined by and being the same as the number of bits of information to be detected in each segment of said images fed to said detector means, first and second storage means, each of which is preassigned to store the image information provided by a correspondingly different one of said optic systems, select means for selectively connecting the signal output of said detector means to the one of said storage means which is preassigned to store the information for the image being scanned, and a plurality of display means, each of which is operative to display the signals stored by a different one of said storage means.

14. An imaging system as set forth in claim 13 which includes position means mechanically rotated with said rotating image scanning member to provide frame signals which indicate the start of scan of the image output of each optic system and segment signals for indicating the scan of successive segments of said image, and sync generator means for generating frame sync signals and segment sync signals in response thereto.

15. A system as set forth in claim 14 in which said select means nclude storage select means operative in response to a frame sync signal from said position means to selectively connect the output of said detector means to the assigned one of said storage means, and readout means operative in response to said segment sync signals from said position means to provide a series of output signals from said detector means which represent a segment of the image scanned thereby.

16. An imaging system as set forth in claim 14 in which said image scanning member comprises a rotating member having frame and segment indicia located thereon to indicate the relative position of said image sensor, a light source for illuminating said indicia, a photocell for detecting passage of said marks relative to a given location, and means for connecting the output of said photocell to said sync generator means.

* * * * *